United States Patent [19]

Hayashi et al.

[11] Patent Number: 5,320,787
[45] Date of Patent: Jun. 14, 1994

[54] APPARATUS AND PROCESS FOR MANUFACTURING SUBSTRATE SHEET FOR INFORMATION RECORDING MEDIUMS

[75] Inventors: Hisanori Hayashi, Kawasaki; Hirofumi Kamitakahara, Yokohama; Hitoshi Yoshino, Zama; Osamu Kanome, Yokohama; Tetsuya Sato, Kawasaki, all of Japan

[73] Assignee: Canon Kabushiki Kaisha, Tokyo, Japan

[21] Appl. No.: 982,440

[22] Filed: Nov. 27, 1992

[30] Foreign Application Priority Data

Nov. 28, 1991 [JP] Japan ................. 3-337918

[51] Int. Cl.⁵ .............................. B29C 59/04
[52] U.S. Cl. ........................ 264/1.3; 264/1.4; 264/1.6; 264/40.6; 264/556; 264/106; 264/216; 264/237; 264/284; 425/143; 425/174.8 E; 425/326.1; 425/327; 425/363; 425/385
[58] Field of Search ........ 264/40.6, 556, 1.3, 264/106, 1.6, 107, 284, 237, 216, 24, 1.4; 425/325, 327, 363, 385, 143, 174.8 E, 326.1

[56] References Cited

U.S. PATENT DOCUMENTS

| | | | |
|---|---|---|---|
| 3,146,492 | 9/1964 | Lemelson | 425/327 |
| 3,478,138 | 11/1969 | Friesner | 264/145 |
| 4,017,575 | 4/1977 | Heyer | 264/556 |
| 4,079,114 | 3/1978 | Bonner | 264/284 |
| 4,968,370 | 11/1990 | Watkins | 264/556 |
| 5,048,745 | 9/1991 | Sato et al. | 264/106 |
| 5,075,060 | 12/1991 | Imataki | 264/106 |
| 5,087,192 | 2/1992 | Kanome et al. | 425/385 |
| 5,147,592 | 9/1992 | Sato et al. | 264/106 |
| 5,158,724 | 10/1992 | Yagi et al. | 425/143 |
| 5,173,313 | 12/1992 | Sato et al. | 264/106 |

FOREIGN PATENT DOCUMENTS

| | | | |
|---|---|---|---|
| 0387037 | 9/1990 | European Pat. Off. | |
| 58-203019 | 11/1983 | Japan | 264/284 |
| 3-36022 | 2/1991 | Japan | 264/106 |
| 2146587A | 4/1985 | United Kingdom | 425/143 |

OTHER PUBLICATIONS

Database WPIL, Week 9046, Derwent Publications Ltd., London GB; AN 90-346053 & JP-A2 251 422 (Canon KK) *abstract*.
Database WPIL, Week 8731, Derwent Publications Ltd., London, GB; AN 87-216203 & JP-A-62 140 817 (Mitsubishi Gas Chem KK) *abstract*.
Patent Abstracts of Japan, vol. 011, No. 364 (M-646) Nov. 27, 1987, & JP-A-62 140 817 (Mitsubishi Gas Chem Co Inc) *abstract*.

*Primary Examiner*—Jeffery Thurlow
*Attorney, Agent, or Firm*—Fitzpatrick, Cella, Harper & Scinto

[57] ABSTRACT

An apparatus and method for manufacturing a substrate sheet for information recording mediums having a roll stamper consisting of a flexible stamper having a pattern corresponding to a preformat for an information recording medium, the flexible stamper being fixed along the corresponding periphery of a roll substrate. A roll is placed opposite the roll stamper. A molten-resin sheet wider than the flexible stamper member is formed. The apparatus has means for bringing the edges of a resin sheet into contact with the roll substrate before releasing the resin sheet from the roll stamper. The temperature is controlled, so that a temperature difference on the surfaces of edges of a resin sheet and a preformat pattern transfer area of the resin sheet is kept within 30° C. when the resin sheet is separated from the roll stamper after the molten-resin sheet has been pressed between the roll stamper and roll.

37 Claims, 9 Drawing Sheets

APPARATUS AND PROCESS FOR MANUFACTURING SUBSTRATE SHEET FOR INFORMATION RECORDING MEDIUMS

BACKGROUND OF THE INVENTION

1. Field of the Invention

The present invention relates to an improved apparatus and process for manufacturing a substrate sheet for information recording mediums such as optical disks and optical cards by continuously transferring preformat patterns to the surface of a resin sheet.

2. Related Background Art

Processes for manufacturing substrates for high-density information recording mediums such as optical disks and optical cards are hitherto known to include processes such as injection molding, compression molding and extrusion. In the injection molding or compression molding, severe conditioning is required for the temperature of molten resin, pressure applied thereto, precision of molds, etc. in order to assure flatness and smoothness of substrates and to prevent occurrence of warpage and inclusion of bubbles in substrates. In addition, an apparatus with a large scale is required, resulting in a high production cost. In the injection molding, it is also difficult to produce substrates as thin as 0.4 mm or less and having a low double refraction or birefringence as in substrates for optical cards. Moreover, in the compression molding and injection molding, substrates are formed sheet-by-sheet end hence their productivity is poor.

As for the extrusion, substrates for information recording mediums can be manufactured by bringing e roll stamper fitted with a stamper member, into pressure contact with the surface of a molten-resin sheet extruded from an extruder and continuously transferring patterns corresponding to preformats such as tracking Grooves or prepits to the surface of the resin sheet. Hence, the extrusion is advantageous for the mass-productivity of substrates, and in recent years 00researc thereon has been put forward as a process for manufacturing substrates for information recording mediums.

Incidentally, roll stampers used in the extrusion, for stamping-molding substrates for information recording mediums are conventionally manufactured by the following methods.

(1) A method in which preformat patterns are directly formed on the corresponding periphery of a roll substrate whose periphery has been mirror-finished (hereinafter "specular roll substrate").

(2) A method in which a flexible stamper member with preformat patterns 23 previously formed on its surface as shown in FIG. 2 is stuck or fixed to the corresponding periphery of a specular roll substrate using an adhesive or by a mechanical means.

Of the above conventional techniques, the method (1) makes it necessary to change the whole roll stamper for a new one even when only one fault is produced in the preformat patterns, resulting in poor molding efficiency. Hence the method (2) is mostly used.

A process of forming a substrate sheet for information recording mediums by extrusion using a roll stamper 24 prepared by the above method (2) will be described below with reference to FIG. 3.

First, resin pellets fed in an extruder 31 is heat-melted in a barrel of the extruder 31, pressed forward by a screw, formed into a sheet by means of a sheet extrusion die 32, and is continuously extruded from the sheet extrusion die 32 as a resin sheet 33 that stands substantially in e molten state. The sheet extrusion die 32 is so provided that the resin sheet is extruded to the gap between a specular roll 34 and the roll stamper 24. Subsequently the molten-resin sheet 33 is pressed between the specular roll 34 and the roll stamper 24 so that the preformat patterns 23 are transferred to the surface of the molten-resin sheet. Thus a substrate sheet 35 for information recording mediums is formed. Here, when width $W_{33}$ of the molten-resin sheet 33 is so set as to be larger than width $W_{21}$ of the flexible stamper member 21 as shown in FIG. 4, a cross-sectional view along the line A—A' in FIG. 3, molding efficiency can be improved since the preformat patterns 23 can be arranged even in the vicinity of widthwise both end portions of the flexible stamper member 21. This is therefore a preferred embodiment.

However, the formation of the substrate sheet for information recording mediums by extrusion in this embodiment has often caused a problem as follows: The flexible stamper member 21 of the roll stamper 24 is fitted in a thickness of 300 to 500 μm in the case of a stamper member made of glass or 100 to 200 μm even in the case of a stamper member made of metal such as Ni so that its strength or the precision of preformat patterns can be ensured. Hence, as shown in FIG. 5, which is a cross section in the direction parallel to the axis of the roll stamper (hereinafter "width direction"), a difference in height $h_{21}$ of at least 100 μm is produced on the surface of the roll stamper. Thus, when the substrate sheet is stamping-molded using this roll stamper and also in the state of $W_{33} > W_{21}$ as stated above, a difference in gap between the roll stamper 24 and the specular roll 34 is produced at end portions of the roll stamper and at an area over which the flexible stamper member is provided, corresponding to $t_{61}$, and $t_{61}$, as shown in FIG. 6, a cross section along the line A—A' in FIG. 3, and hence the ends of the molten-resin sheet 33 toward the outsides of the widthwise both ends 63 of the flexible stamper member 21 (hereinafter "resin sheet edges") are not pressed between the roll stamper 24 and the specular rolls 34 and 36. As a result, the heat at the resin sheet edges can not be immediately removed to cause a great difference in cooling rate between the resin sheet edges and a preformat pattern transfer area, bringing about the problem that strain is produced at the preformat pattern transfer area.

Another problem has occurred such that, because of insufficient cooling at the resin sheet edges which tends to give the edges a self-supporting action, the resin sheet edges hang down to cause deformation in the preformat pattern transfer area of the resin sheet, or that the resin sheet edges hanging down and having solidified cause vibration of the roll stamper when they pass between the specular roll 34 and roll stamper 24 or between the roll stamper 24 and the specular roll 36, resulting in a poor transfer precision of preformat patterns.

These problems remarkably occur when the molten resin is made to have a high temperature. On the other hand, a method in which the temperature of the molten-resin sheet is enhanced is studied as a method by which the birefringence-free properties of substrate sheets or the transfer performance of preformat patterns are improved. Thus, the problem on the resin sheet edges is a very important technical subject in the manufacture of substrate sheet with a higher quality.

SUMMARY OF THE INVENTION

The present invention was made taking account of the problems discussed above. An object of the present invention is to provide an apparatus for manufacturing a substrate sheet for information recording mediums, that reduces the influence of the resin sheet edges on the preformat pattern transfer area and can obtain a substrate sheet for information recording mediums much improved in birefringence-free properties and preformat pattern transfer performance, and a process for manufacturing it.

The apparatus for manufacturing a substrate sheet for information recording mediums according to the present invention comprises:

a roll stamper comprising a flexible stamper member having a pattern corresponding to a preformat for an information recording medium, fixed along the corresponding periphery of a roll substrate;

a specular roll provided opposingly to said roll stamper; and a means for melt-extruding a resin and stamping-molding a molten-resin sheet having a larger width than said flexible stamper member;

said means for stamping-molding the molten-resin sheet being so provided that the molten-resin sheet is extruded to the gap between said roll stamper and said specular roll;

wherein said apparatus has a means for controlling temperature so that a temperature difference on the surfaces of edges and preformat pattern transfer area of said resin sheet is kept within 30° C. when the resin sheet is separated from said roll stamper after the molten-resin sheet has been pressed between said roll stamper and said specular roll.

In a preferred embodiment, the apparatus for manufacturing a substrate sheet for information recording mediums according to the present invention comprises:

a roll stamper comprising a flexible stamper member having a pattern corresponding to a preformat for an information recording medium, fixed along the corresponding periphery of a roll substrate;

a specular roll provided opposingly to said roll stamper; and a means for melt-extruding a resin and stamping-molding a molten-resin sheet having a larger width than said flexible stamper member;

said means for stamping-molding the molten-resin sheet being so provided that the molten-resin sheet is extruded to the gap between said roll stamper and said specular roll;

wherein said specular roll has a depression formed in the periphery of the specular roll 14 at its position facing a protrusion formed along the corresponding periphery of the roll stamper by the flexible stamper member.

In another preferred embodiment, the apparatus for manufacturing a substrate sheet for information recording mediums according to the present invention comprises:

a roll stamper comprising a flexible stamper member having a pattern corresponding to a preformat for an information recording medium, fixed along the corresponding periphery of a roll substrate;

a specular roll provided opposingly to said roll stamper; and a means for melt-extruding a resin and stamping-molding a molten-resin sheet having a larger width than said flexible stamper member;

said means for stamping-molding the molten-resin sheet being so provided that the molten-resin sheet is extruded to the gap between said roll stamper and said specular roll;

wherein a roll member is provided opposingly to the region where no flexible stamper member is fitted at each end portion of said roll stamper.

In a further preferred embodiment, the apparatus for manufacturing a substrate sheet for information recording mediums according to the present invention comprises:

a roll stamper comprising a flexible stamper member having a pattern corresponding to a preformat for an information recording medium, fixed along the corresponding periphery of a roll substrate;

a specular roll provided opposingly to said roll stamper; and a means for melt-extruding a resin and stamping-molding a molten-resin sheet having a larger width than said flexible stamper member;

said means for stamping-molding the molten-resin sheet being so provided that the molten-resin sheet is extruded to the gap between said roll stamper and said specular roll;

wherein a fluid pressure means is provided opposingly to the region where no flexible stamper member is fitted at each end portion of said roll stamper.

In a still further preferred embodiment, the apparatus for manufacturing a substrate sheet for information recording mediums according to the present invention comprises:

a roll stamper comprising a flexible stamper member having a pattern corresponding to a preformat for an information recording medium, fixed along the corresponding periphery of a roll substrate;

a specular roll provided opposingly to said roll stamper; and a means for melt-extruding a resin and stamping-molding a molten-resin sheet having a larger width than said flexible stamper member;

said means for stamping-molding the molten-resin sheet being so provided that the molten-resin sheet is extruded to the gap between said roll stamper and said specular roll;

wherein a charger for charging edges of said resin sheet to a given polarity is provided opposingly to the region where no flexible stamper member is fitted at each end portion of said roll stamper, and a means by which the periphery of said roll stamper is charged to a polarity reverse to that of the resin sheet edges is provided.

The process for manufacturing a substrate sheet for information recording mediums according to the present invention comprises the steps of:

melt-extruding a resin to form a molten-resin sheet; and bringing said resin sheet into contact with a roll stamper provided along its periphery with a flexible stamper member having a pattern corresponding to a preformat for an information recording medium and having a width smaller than said resin sheet, to transfer said preformat pattern to the surface of said resin sheet;

wherein the temperature of said resin sheet in its width direction is so controlled that a temperature difference on the surfaces of edges and preformat pattern transfer area of said resin sheet is kept within 30° C. when said resin sheet is separated from said roll stamper after the molten-resin sheet has been brought into contact with said roll stamper.

BRIEF DESCRIPTION OF THE DRAWINGS

FIG. 4 is a cross section along the line A—A' in. FIG. 3.

FIGS. 10A and 10B schematically illustrate a second embodiment of the apparatus for manufacturing a substrate sheet for information recording mediums according to the present invention, in which FIG. 10A is a cross section of the manufacturing apparatus in the peripheral direction of its roll stamper and FIG. 10B is a cross section along the line D—D' in FIG. 10A.

FIGS. 13A and 13B schematically illustrate a third embodiment of the apparatus for manufacturing a substrate sheet for information recording mediums according to the present invention, in which FIG. 13A is a cross section of the manufacturing apparatus in the peripheral direction of its roll stamper and FIG. 13B is a cross section along the line E—E' in FIG. 13A.

DESCRIPTION OF THE PREFERRED EMBODIMENTS

The present invention will be described below in detail with reference to the accompanying drawings.

Figure 1:
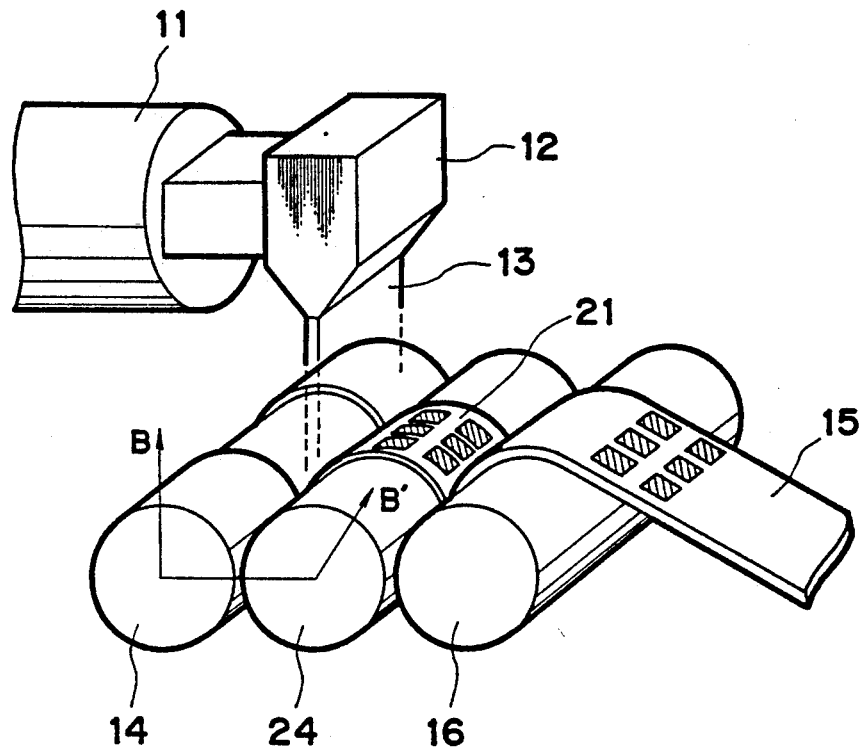
FIG. 1 is a schematic illustration of a first embodiment of the apparatus for manufacturing a substrate sheet for information recording mediums according to the present invention.
Figure 2:
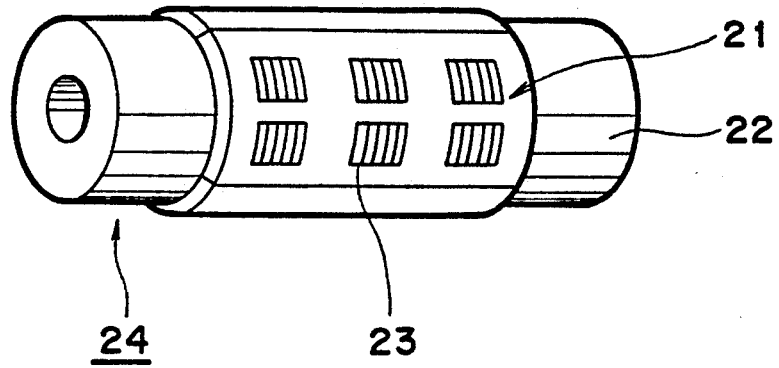
FIG. 2 is a perspective view of a roll stamper comprising a flexible stamper member fixed along the corresponding periphery thereof.
Figure 3:
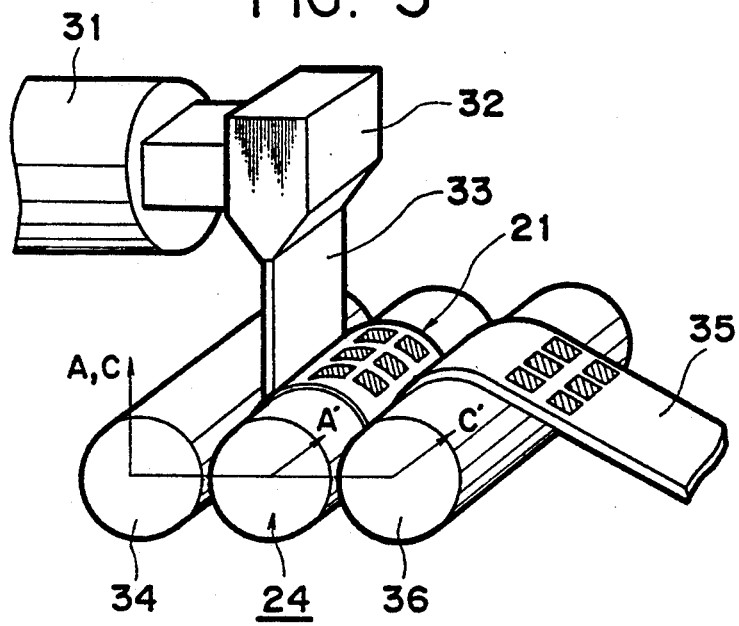
FIG. 3 is a schematic illustration of an apparatus for manufacturing a substrate sheet for information recording medium by extrusion and stamping-molding.
Figure 4:
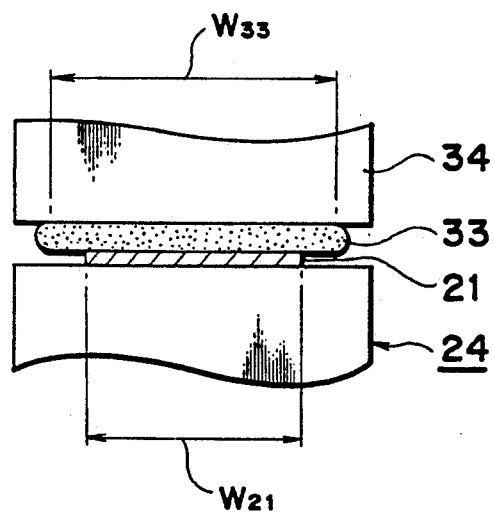

FIG. 1 is a schematic illustration of a first embodiment of the apparatus for manufacturing a substrate sheet for information recording mediums according to the present invention.

Figure 7:
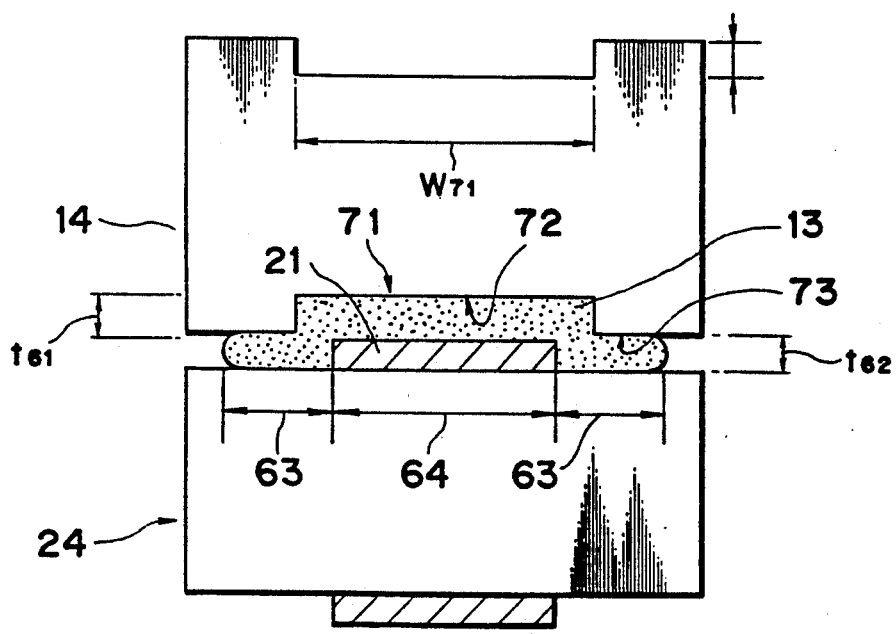
FIG. 7 is a cross section along the line B—B' in FIG. 1.

In FIG. 1, reference numeral 11 denotes an extruder; 12, a sheet extrusion die by which a resin melted in the extruder is formed into a sheet; and 14 and 16, each a specular roll provided opposingly to a roll stamper 24. The sheet extrusion die 12 is formed in a width larger then width $W_{21}$ of a flexible stamper member 21 and is so provided that the molten-resin sheet extruded from the sheet extrusion die is extruded to the gap between the specular roll 14 and roll stamper 24. In the present invention, as shown in FIG. 7, a depression 71 is formed in the periphery of the specular roll 14 at its position facing a protrusion formed along the corresponding periphery of the roll stamper as a result of the fitting of the flexible stamper member. According to the substrate sheet manufacturing apparatus of the present embodiment, ends of the molten-resin sheet 33 toward the outsides of the widthwise both ends of the flexible stamper member 21, i.e., resin sheet edges 63 are brought into contact with the corresponding peripheries of the roll stamper 24 by the specular roll 14, so that a temperature difference on the surfaces of the edges 63 and preformat pattern transfer area of the resin sheet can be kept within 30° C., and particularly within 20° C., when the resin sheet is separated from the roll stamper 24. It is thus possible to solve the problems of a strain produced in the preformat pattern transfer area, caused by the resin sheet edges, and a faulty transfer of preformat patterns, which tend to occur when the molten-resin sheet is made to have a high temperature.

In the present embodiment, when the gap defined between the bottom of the depression and the surface of the flexible stamper member 21, i.e., the thickness of the substrate sheet at the preformat pattern transfer area is represented by $t_{61}$, the gap defined between a top surface line 73 of the depression 71 of the specular roll 14 and the surface of the roll stamper 24 on which no flexible stamper member 21 is fitted is represented by $t_{62}$, and the thickness of the flexible stamper member 21 is represented by $h_{21}$, the depth of the depression 71 formed in the periphery of the specular roll 14 may preferably be so set as to satisfy the relationship of the following expression (1).

$$0 < t_{62} < h_{21} + t_{61} \qquad (1)$$

In particular, the depth of the depression 71 may preferably be so set as to satisfy the relationship of the expression (2):

$$0.9 t_{61} \leq t_{62} \leq 1.3 t_{61} \qquad (2),$$

whereby any strain due to excessively rapid cooling of the resin sheet edges relative to the preformat pattern transfer area can be prevented from being produced in the preformat pattern transfer area of the resin sheet.

The gap $t_{62}$ may also preferably be so set as to satisfy the relationship of the expression (3):

$$|t_{61} - t_{62}| \leq 0.025 \times t_{61} \qquad (3),$$

whereby the flowability of the resin sheet can be free from being hindered when the resin sheet is pressed between the flexible stamper member 21 of the roll stamper 24 and the bottom 72 of the depression 71 and also the preformat pattern transfer area 64 can be prevented from occurrence of birefringence.

In the present embodiment, width $W_{71}$ of the depression 71 formed in the specular roll 14 may be not less than the width $W_{21}$ (of the flexible stamper member 21)+$2 \times t_{61}$ and not more than 0.95 time the width $W_{33}$ of the resin sheet, in particular, not less than ($W_{21}+3 \times t_{61}$) and not more than 0.85 time the width $W_{33}$, whereby the resin sheet edges 63 can be surely cooled and also any strain can be prevented from being produced in the edge surfaces of the preformat pattern transfer area when any excess pressure is applied to the vicinity of the boundaries between the edges and preformat pattern transfer area of the resin sheet.

Figure 8A:
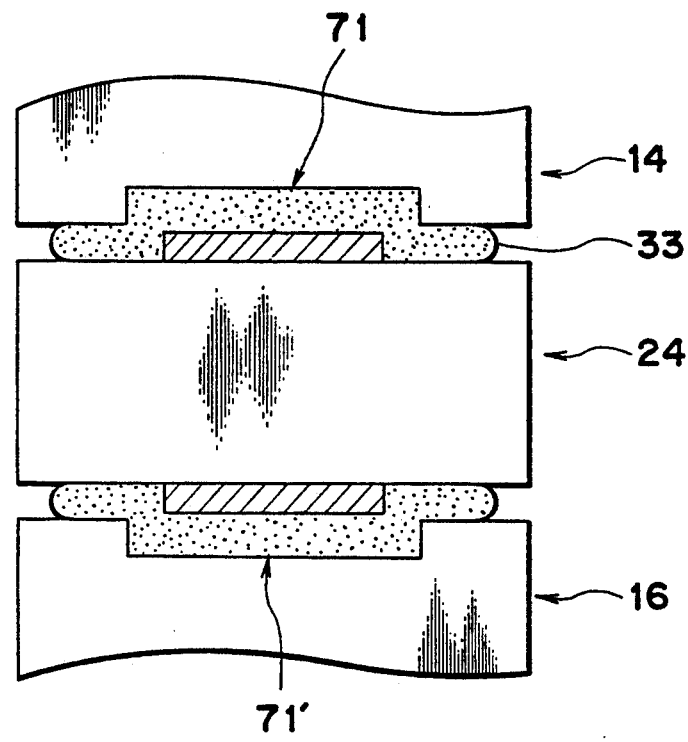
FIGS. 8A and 8B are each a cross section in the axial directions of a roll stamper and a specular roll(s), showing variations of the manufacturing apparatus according to the first embodiment of the present invention.

In the present embodiment, as shown in FIG. 8A, a depression 71' like the depression in the specular roll 14 may also be provided in the corresponding periphery of the specular roll 16. In this instance, the temperature at the resin sheet edges can be controlled with greater precision.

Figure 8B:
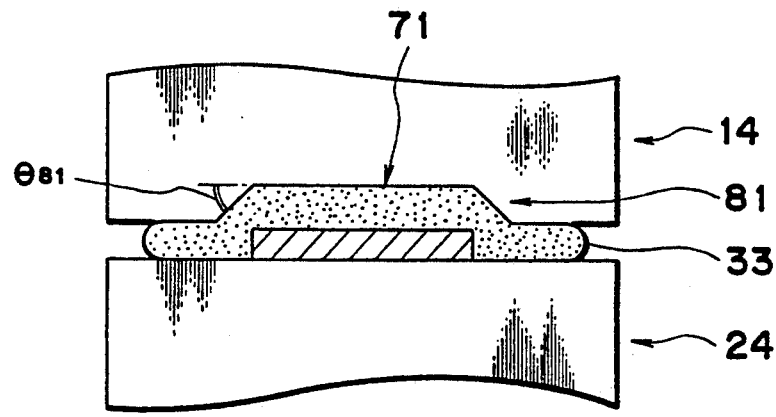

As shown in FIG. 8B, the depression 71 may also preferably be made to have an angle $\theta_{81}$ at its terraced portion 81. In this instance, the flow of resin toward the resin sheet edges can be made smooth when the resin sheet is pressed between the roll specular roll 14 and roll stamper 24 and also any strain can be effectively prevented from being produced in the vicinity of the boundaries between the edges and preformat pattern transfer area of the resin sheet. Here, the $\theta_{81}$ should be set to be $30° \leq \theta_{81} < 90°$, and preferably $45° \leq \theta_{81} < 80°$.

Figure 9A:
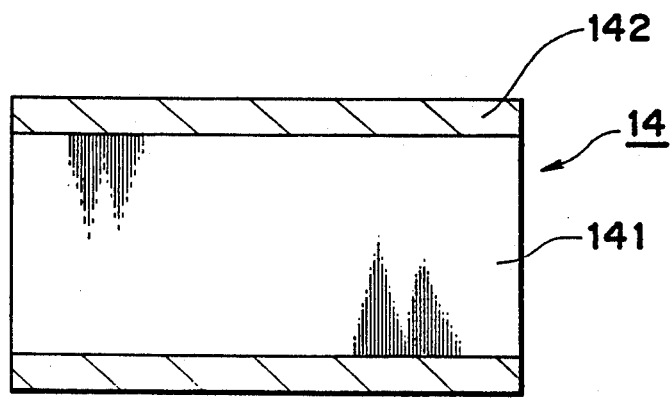
FIGS. 9A and 9B illustrate methods for preparing a specular roll 14 used in the manufacturing apparatus according to the first embodiment of the present invention.
Figure 9B:
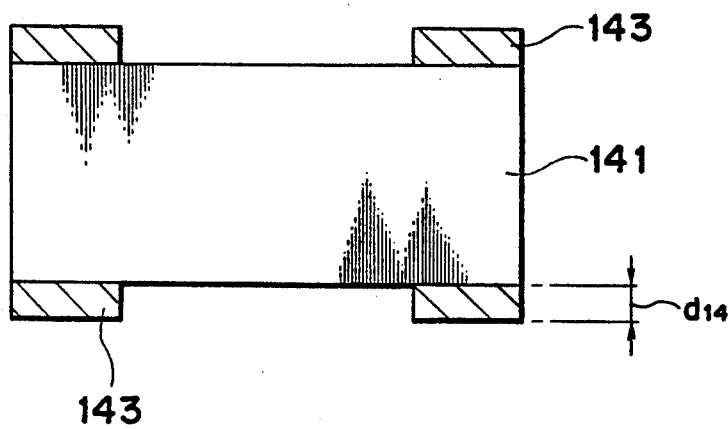

In the present embodiment, the depression can be formed in the periphery of the specular roll 14 in the following way: For example, as shown in FIG. 9A, a coat of a metal or heat-resistant resin capable of being specularly abraded is provided on the periphery of a substrate 141 of the specular roll 14 and is then cut using a precision lathe. Alternatively, as shown in FIG. 9B, heat-resistant sheets with given thicknesses, free from deformation even upon their contact with the molten-resin sheet, are directly bonded to the specular roll at both ends thereof using an adhesive, or fastened thereto by a mechanical means using a fixing means such as screws or metal belts. The heat-resistant sheets are exemplified by metal sheets such as copper, nickel or aluminum sheets, alloy sheets such as brass, stainless steel or light alloy sheets, ceramic sheets such as BN, SiN, glass, $Al_2O_3$ or titanium nitride sheets, or plastic sheets such as polyimide, polyether imide or aromatic polyamide sheets. The adhesive is exemplified by an organic adhesive such as an epoxy type adhesive, a silicone type adhesive or a cyanoacrylate type adhesive or an inorganic adhesive such as water glass or low-melting glass.

Figure 10A:
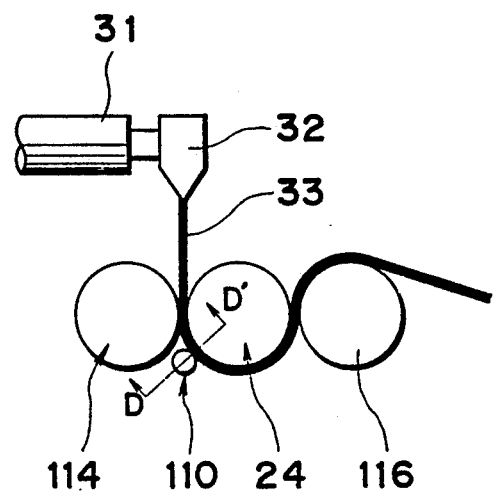
Figure 10B:
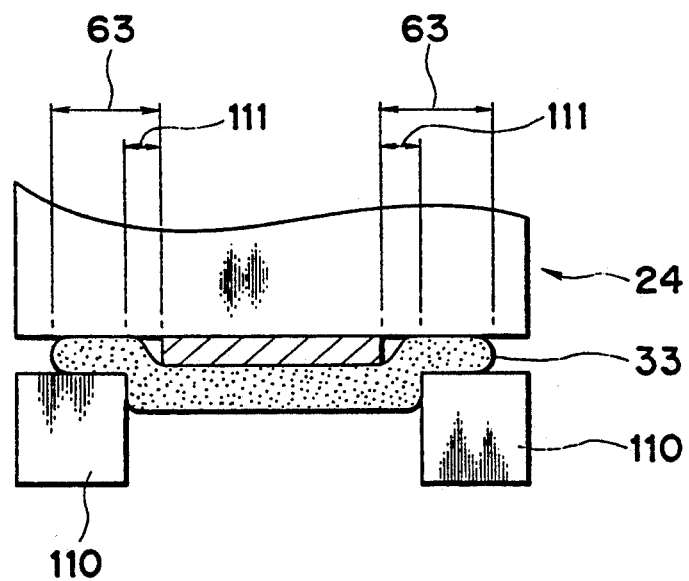

A second embodiment of the apparatus for manufacturing a substrate sheet for information recording mediums according to the present invention will be described below with reference to FIGS. 10A and 10B. In FIGS. 10A and 10B, reference numerals 31, 32 and 33 denote the same members as in the first embodiment. Reference numerals 114 and 116 denote specular rolls provided opposingly to the roll stamper 24. Reference numeral 110 denotes a means for controlling the temperature of resin sheet edges 63, and is a Poll member serving as a means for bringing the resin sheet edges 63 into contact with the corresponding periphery of the roll stamper 24. As the roll member 110, a pair of roll members 110 may be so provided that, as shown in FIG. 10B, the resin sheet edges may come in contact with the periphery of the roll stamper 24 at its regions outward by a given distance 111 or more from the ends of the flexible stamper member. In this instance, no stress can concentrate at the boundary regions between the edges and preformat pattern transfer area of the resin sheet and hence any strain can be prevented from being produced in the preformat pattern transfer area of the resin sheet. This given distance 111 may preferably be not less than the thickness of the resin sheet at its preformat pattern transfer area, i.e., $t_{61}$, and particularly preferably not less than $1.5 \times t_{61}$.

The roll member 110 may also preferably be so provided that the distance between its surface and the surface of the Poll stamper 24 at the part on which no flexible stamper member 21 is fitted may fall within the range of the $t_{62}$ previously described.

In the present embodiment, the roll member 110 may be constituted in the manner that its surface temperature can be controlled, for example, in the manner that a cooling fluid fed from the outside can circulate the inside of the roll member. Use of the roll member so constituted makes it possible to more accurately control the cooling rate of the resin sheet edges.

Figure 11:
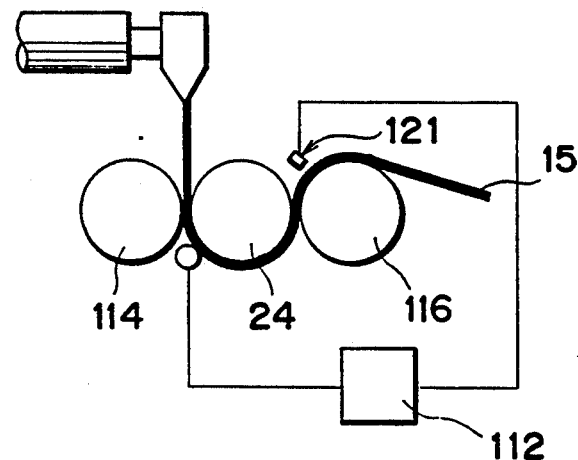
FIG. 11 is a schematic cross section of a variation of the manufacturing apparatus according to the second embodiment of the present invention.
Figure 12:
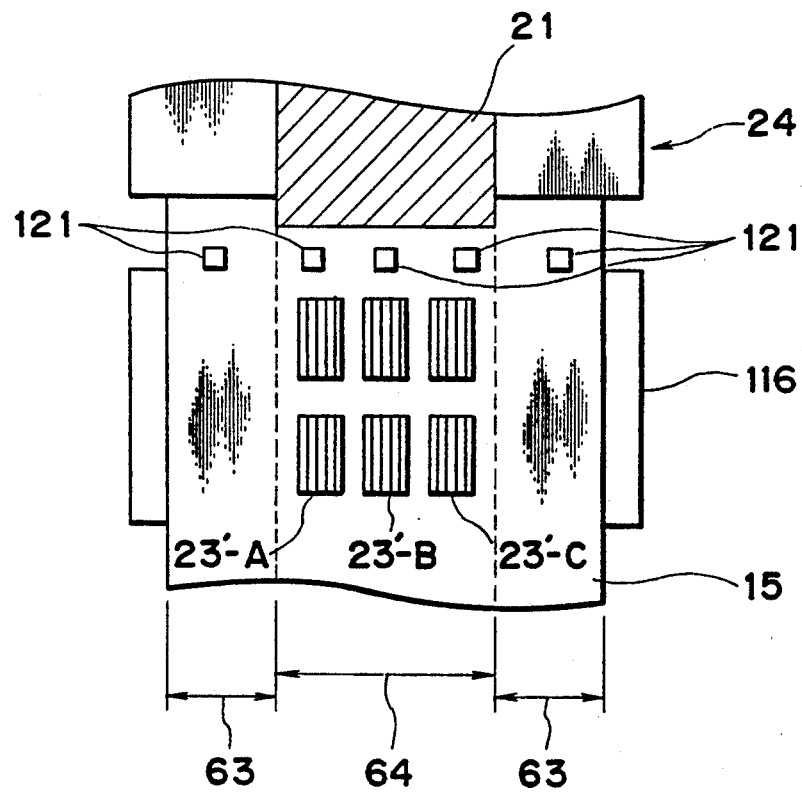
FIG. 12 is a schematic plan view of the resin sheet in FIG. 11 in the vicinity of the part at which its surface temperature is measured.

Together with use of such a roll member, as shown in FIGS. 11 and 12, a surface temperature measuring means 121 that measures surface temperature of the edges and preformat pattern transfer area 64 of the resin sheet may be provided so that the values detected by the surface temperature measuring means 121 can be fed back to the surface temperature control means of the roll member to regulate the surface temperature of the roll member 110. It is thereby possible to more accurately control the temperature of the resin sheet edges 63. In this instance, the surface temperature of the roll member 110 can be controlled, for example, in the following way: each surface temperature of the edges and preformat pattern transfer area of the resin sheet, detected by the surface temperature measuring means, are averaged for each given sampling time, and the resulting average values are taken out so as to be calculated by a computer 112 connected to the surface temperature measuring means, where the average values are compared to each other. When the surface temperature of the edges 63 is lower than the surface temperature of the preformat pattern transfer area 64, the surface temperature of the roll member 110 is raised. When on the other hand the surface temperature of the edges 63 is higher than the surface temperature of the preformat pattern transfer area 64, the surface temperature of the rolls, ember 110 is dropped. Such control can make the difference very small in the surface temperature between the edges 63 and preformat pattern transfer area 64 at the part where the resin sheet is separated from the roll stamper, so that a substrate sheet for information recording mediums with a high quality can be obtained with good productivity.

Figure 13A:
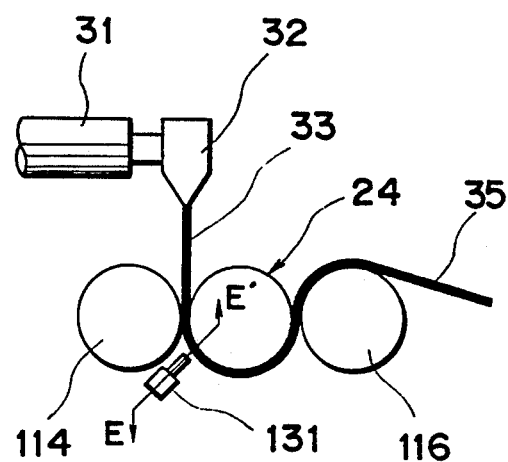
Figure 13B:
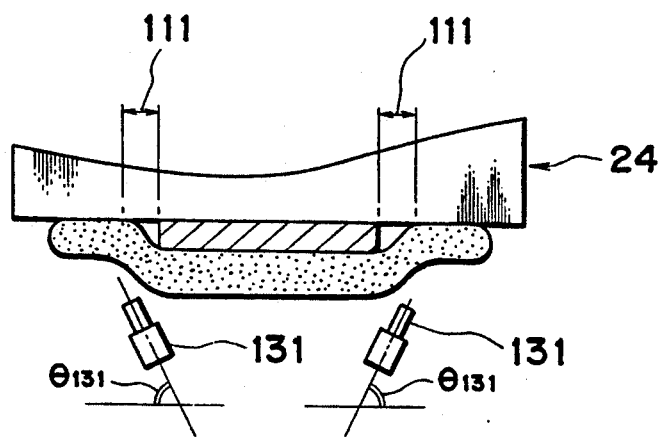

A third embodiment of the apparatus for manufacturing a substrate sheet for information recording mediums according to the present invention will be described below with reference to FIGS. 13A and 13B. In FIGS. 13A and 13B, reference numerals 24, 31, 32, 33, 114 end 116 denote the same members as in the second embodiment. Reference numeral 131 denotes a means for controlling the temperature of resin sheet edges 63, and is a fluid pressure means serving as a means for bringing the resin sheet edges 63 into contact with the corresponding periphery of the roll stamper 24. This fluid pressure means may be so provided that its fluid pressure can be applied to the resin sheet edges at a force large enough for the resin sheet edges to be brought into a relation of close contact with the periphery of the roll stamper 24 at its regions outward by a given distance 111 or more from the ends of the flexible stamper member. Thus, the resin sheet edges can be cooled without causing any strain in the preformat pattern transfer area of the resin sheet. This given distance 111 may preferably be not less than the thickness of the resin sheet at its preformat pattern transfer area, i.e., $t_{61}$, and particularly preferably not less than $1.5 \times t_{61}$.

The minimum force of the fluid pressure applied from the fluid pressure means depends on its relation with the viscosity of molten-resin sheet and the thickness thereof. In the case of acrylic resin or polycarbonate resin with a thickness of about 0.3 to 1.4 mm, the fluid pressure may usually be in the range of from 5 to 50 g/cm$^2$, and particularly preferably from 10 to 20 g/cm$^2$.

The fluid pressure means 131 may be any apparatus capable of forming a Gas curtain on the surfaces of the resin sheet edges 63, and is exemplified by an air knife or an air pressure zone formed of a porous material capable of passing air or other gasses.

The fluid pressure means 131 may preferably be provided right beneath a nip point formed by the roll stamper 24 and specular roll 14.

In instances where the fluid pressure means 131 comprises a pressure means whose force is directed to the resin sheet edges through relatively small slots or openings, the incident angle of the gas with respect to the resin sheet edge can be variously changed. As shown in FIG. 13B, the angle may be so set that the Gas shoots the resin sheet edge at an angle $\theta_{131}$ slightly smaller than 90°, for example, at about 45° to 80°. This provides an advantage that the gas which may turn aside toward the preformat pattern transfer area of the resin sheet can be small and hence the preformat pattern transfer area of the resin sheet can be prevented from undesirable earlier cooling.

An advantage of using the fluid pressure means 131 over using the roll member as the temperature control means of the resin sheet edges 63 is that the stress applied to the resin sheet edges can be made much smaller than that applied when the roll member is used, and hence any adverse influence the temperature control means may have on the preformat pattern transfer area of the resin sheet can be minimized.

Figure 14:
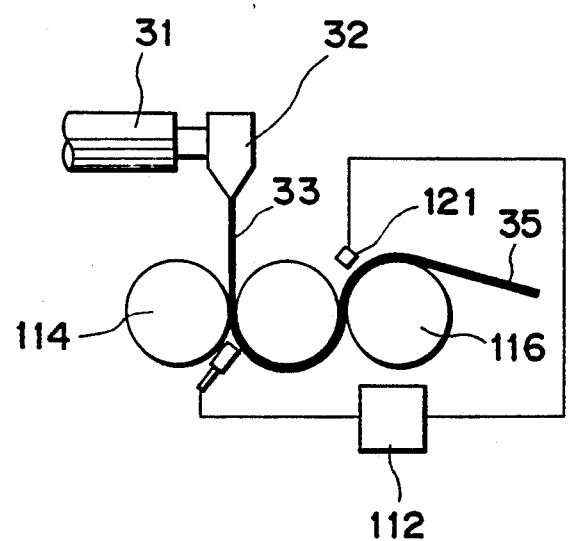
FIG. 14 is a schematic cross section of a variation of the manufacturing apparatus according to the third embodiment of the present invention.

The fluid pressure means 131 described above may be constituted in manner that its fluidity temperature can be controlled. As shown in FIG. 14, a surface temperature measuring means 121 that measures surface temperatures of the edges 63 and preformat pattern transfer area 64 of the resin sheet may be further provided so that the values detected by the surface temperature measuring means 121 can be fed back to a fluid temperature control means to regulate the temperature of the fluid. It is thereby possible to more accurately control the temperature of the resin sheet edges 63.

Figure 15:
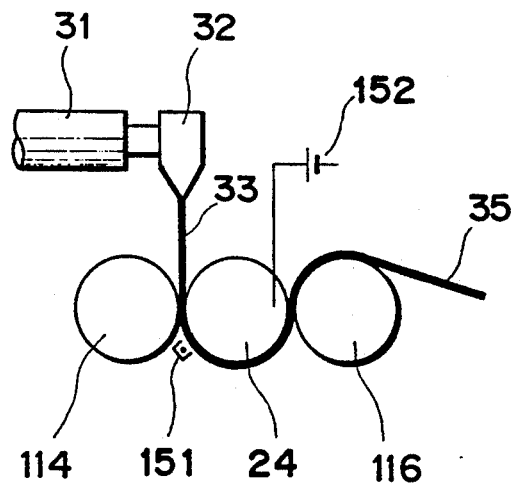
FIG. 15 is a schematic illustration of a fourth embodiment of the apparatus for manufacturing a substrate sheet for information recording mediums according to the present invention.

A fourth embodiment of the apparatus for manufacturing a substrate sheet for information recording mediums according to the present invention will be described below with reference to FIG. 15. In FIG. 15, reference numerals 24, 31, 32, 33, 114 and 116 denote the same members as those in FIG. 13. Reference numeral 151 denotes a means for bringing the resin sheet edges into contact with the corresponding periphery of the roll stamper and is a charger that charges the resin sheet edges to a given polarity, which is provided opposingly to the region where no flexible stamper member is fitted at each end portion of said roll stamper. Reference numeral 152 denotes a means by which the periphery of the roll stamper is charged to a polarity reverse to that of the resin sheet edges charged by means of the charger 151.

In the apparatus constituted in this way, the resin sheet edges can be attracted to the corresponding periphery of the roll stamper and hence the removal of heat from the resin sheet edges can be promoted, so that the temperature difference on the surfaces of the edges 63 and preformat pattern transfer area of the resin sheet can be kept within 30° C. when the resin sheet is separated from the roll stamper 24. In the present embodiment, the means for charging the resin sheet edges may include a corona charger.

Successive manufacture of the substrate sheet for information recording mediums, using the apparatus as shown in FIG. 1 will be described below with reference to FIG. 1. First, resin pellets fed in an extruder 11 ere melted, end the molten resin is extruded from the sheet extrusion die 12 while being formed into e sheet. At this stage the resin temperature is set to be from 260° C. to 350° C. in the case of, for example, polycarbonate resin. Subsequently, the molten-resin sheet 13 is first pressed between the specular roll 14 end roll stamper 24 and next between the roll stamper 24 end another specular roll 16 so that preformat patterns 23 on the surface of the flexible stamper member 21 is transferred to the surface of the molten-resin sheet 13. Thus e substrate sheet 15 for information recording mediums is formed.

At this stage, the roll stamper 24 of the present invention is kept at e temperature such that the resin sheet is cooled to a temperature not higher than its thermal deformation temperature without causing any strain or wrinkle thereof on the roll stamper 24.

More specifically, the roll stamper may preferably be heated to a temperature within the range of $+20°$ to $-20°$ C. of the thermal deformation temperature of the resin used. When, for example, polycarbonate resin is stamping-molded, the roll stamper may preferably be heated to have a surface temperature of from 100° to 160° C. That is, the heating in this temperature range does not allow the molten-resin sheet to rapidly cool and hence no strain such as shrinkage tends to be produced in the resin sheet. The specular rolls provided opposingly to the roll stamper may preferably be set to temperatures equal to or slightly lower than the roll stamper 24.

The temperatures of these rolls can be controlled, for example, by electrically heating the rolls with heaters casted in them or by circulating a heating medium through the centers of the rolls.

The sheet extrusion die and the specular roll 14 and roll stamper 24 are so constituted that they cooperate each other so as to give a substrate sheet with a thickness of, for example, from 0.3 to 1.5 mm upon cooling, after the molten-resin sheet extruded from the sheet extrusion die has been pressed between the specular roll 14 and roll stamper 24.

In the present invention, a variety of thermoplastic resins capable of being softened by heat and made stamping-moldable can be used. For example, it is possible to use polypropylene, polyethylene, polycarbonate, polyvinyl chloride, polyester, polystyrene and polymethyl methacrylate. In particular, polycarbonate may preferably be used in view of preformat pattern transfer performance in its molten state, and also in view of its transparency and hardness that are required when formed into the substrate sheet for information recording mediums and its less moisture absorption required for preventing warpage.

The preformat pattern 23 formed on the surface of the flexible stamper member 21 that constitutes the roll stamper 24 used in the present invention may specifically include, for example, a pattern corresponding to optical disk or optical card tracking groove or grooves in the form of a spiral, concentric circles or stripes with a groove width of 0.5 to 2 $\mu$m, a groove pitch of 1 to 5 $\mu$m end a groove depth of 200 to 5,000 Å, a pattern corresponding to optical disk or optical card tracking groove or grooves in the form of a spiral, concentric circles or stripes with a groove width of 2 to 5 $\mu$m, a groove pitch of 8 to 15 $\mu$m and a groove depth of 200 to 5,000 Å, and a pattern corresponding to prepits provided in or between these grooves.

As described above, according to the present invention, even when the molten-resin sheet is made to have a larger width than the flexible stamper member so that the stamping-molding efficiency can be improved, the difference in cooling rate between the edges end preformat pattern transfer area of the resin sheet can be decreased or made substantially zero and hence any strain can be prevented from being produced in the preformat pattern transfer area of the resin sheet.

In addition, according to the present invention, the resin sheet edges can be surely cooled even when the melt temperature of the resin sheet is set to a high temperature, and hence it is possible to prevent the resin sheet edges from hanging down and concurrently causing deformation of the preformat pattern transfer area of the resin sheet and faulty transfer of preformat patterns.

EXAMPLES

The present invention will be described below in greater detail by giving Examples.

EXAMPLE 1

A roll stamper was prepared in the following way.

Figure 5:
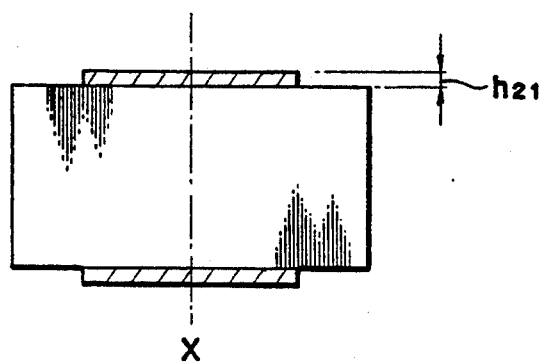
FIG. 5 is is a cross section in the direction parallel to the axis of the roll stamper comprising a flexible stamper member fixed along the corresponding periphery thereof.
Figure 6:
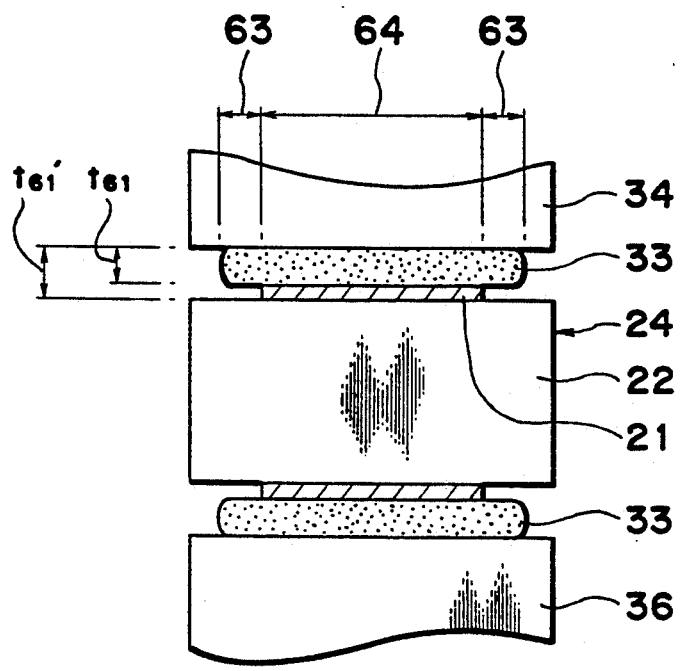
FIG. 6 is a cross section along the line C—C' in FIG. 3.

To the desired region of the periphery of a roll substrate of 300 mm in diameter and 400 mm broad, made of carbon steel, a flexible stamper member of 110 mm broad and 0.2 mm thick, made of nickel, was fixed by a mechanical means via a polyimide sheet of 0.1 mm thick to produce e roll stamper 24 having the cross-sectional shape as shown in FIG. 5 and $h_{21}$ of 0.3 mm. On the surface of the flexible stamper member, three preformat patterns each comprised of a pattern formed in a rectangular region of 30 mm broad and 80 mm long, corresponding to optical card tracking grooves having a length of 85 mm, a width of 3 $\mu$m and a pitch of 12 $\mu$m were formed in the width direction of the flexible stamper member at intervals of 5 mm each other. The flexible stamper member was fixed to the roll substrate in the manner that their central lines X coincide each other as shown in FIG. 5.

In the meantime, to the peripheries of both end portions of a specular roll substrate of 300 mm in diameter and 400 mm broad, made of carbon steel, nickel sheets of 0.2 mm thick and 144.2 mm broad were bonded using an adhesive (trade name: TSE-322; Toshiba Silicone Co., Ltd.) to produce a specular roll 14 having the cross-sectional shape as shown in FIG. 9B, having a depression of 0.3 mm in depth ($d_{14}$) and 111.6 mm in width ($W_n$).

Using the roll stamper 24 and specular roll 14 thus obtained and another specular roll 16 of 300 mm in diameter and 400 mm broad, made of carbon steel, the apparatus for manufacturing a substrate sheet for optical cards, as shown in FIG. 1 was set up. Here, the roll stamper 24 and the specular roll 14 were so provided as to give $t_{61}$ of 0.405 mm. Therefore, $t_{62}$ is 0.405 mm. At the part where the resin sheet is separated from the roll stamper 24, infrared radiation thermometers 121 (trade name: VIDEO SYSTEM TVS-5000; manufactured by Japan Avionics Co.) were disposed as shown in FIG. 12.

Next, using this apparatus, an optical card substrate sheet of 0.4 mm thick was prepared. More specifically, using an extruder of 35 mm in diameter, a molten-resin sheet of 255 mm in width $W_{33}$ was formed under conditions of a die 12 temperature of 340° C. and a roll stamper 24 surface temperature of 145° C., at a throughput of 11 kg/h and an extrusion speed of 1.5 m/min. The resulting resin sheet was pressed between the roll stamper 24 end specular roll 14 and then between the roll stamper 24 and specular roll 16 to carry out transfer of preformat patterns for 5 hours. As a result, the temperature difference on the surfaces of the edges and preformat pattern transfer area of the resin sheet at the part where the resin sheet was separated from the roll stamper 24 was always kept within 20° C., and no resin sheet edges were seen to hang down.

Six samples of optical card substrate sheets were also obtained in respect of those obtained immediately after initiation of stamping molding, 1 hour thereafter, after 2 hours, after 3 hours, after 4 hours and after 5 hours. On these samples, thicknesses, preformat pattern transfer efficiency and birefringence of three preformat pattern transferred areas 23'-A, 23'-B and 23'-C (see FIG. 12) in the width direction were measured to make evaluation.

Results obtained are shown in Table 1 below.

TABLE 1

| | 23'-A | 23'-B | 23'-C |
|---|---|---|---|
| Thickness: | A | AA | A |
| Transfer efficiency: | A | AA | A |
| Birefringence: | A | AA | A |

The above thickness, transfer efficiency and birefringence of the substrate sheets were measured and evaluated according to the following methods and criteria:

i) Substrate sheet thickness

First, substrate sheet thicknesses of 9 points in each preformat pattern transferred area on each sample were measured using a micrometer (trade name: IDC-112MB; manufactured by Mitsutoyo K. K.) and average values of the measurements were calculated. Next, from the resulting values, average values of substrate sheet thicknesses of the preformat pattern transferred areas 23'-A, 23'-B and 23'-C each were calculated. Thickness precision of the substrate sheet was evaluated based on deflection width T of the resulting values with respect to the standard value 0.4 mm of optical card substrates.

Evaluation criteria:

AA: T ≦ ±5 $\mu$m
A: ±5 $\mu$m < T ≦ ± + 10 $\mu$m
B: ±10 $\mu$m < T ≦ ±40 $\mu$m
C: ±40 $\mu$m < T ii) Substrate sheet birefringence First, birefringences of 9 points in each preformat pattern transferred area on each sample were measured and average values of the measurements were calculated. Next, from the resulting values, birefringence of the preformat pattern transferred areas 23'-A, 23'-B and 23'-C each was calculated, and the resulting values were evaluated. The value of birefringence as used in the present invention is a value of a single path, obtained using a semiconductor laser (spot diameter: 1 mm) with a wavelength of 830 nm.

Evaluation criterions:
AA: Not more than 20 nm
A: From more than 20 nm to not more than 30 nm
B: More than 30 nm iii) Preformat pattern transfer efficiency First, a cross section crossing 9 tracking grooves st each preformet pattern transferred area each sample was observed using an electron ray surface profile analyzer (trade name: ESA-3000; manufactured by Elionics Co.) to determine cross-sectional areas a of groove valleys, end cross-sectional areas A of stamper hills corresponding to the Groove valleys were also determined, where average values of values a/A were calculated. Then, from the resulting values, average values of a/A st the preformat pattern transferred areas 23'-A, 23'-B and 23'-C each were calculated, and the resulting values were evaluated.

Evaluation criteria:
AA: Not less then 0.99
A: From 0.95 to less than 0.99
B: From 0.90 to less than 0.95
C: Less than 0.90

COMPARATIVE EXAMPLE 1

An optical card substrate sheet was produced in the same manner as in Example 1 except that the specular roll 14 used therein was replaced with a specular roll of 300 mm in diameter and 400 mm in width. As a result, the resin sheet edges hanged down to cause faulty transfer of preformet patterns.

EXAMPLE 2

An optical card substrate sheet was produced in the same manner as in Example 1 except that the specular roll 14 used therein was replaced with a specular roll 14 whose nickel sheets bonded to the peripheries of its both end portions was made to have a width of 144.6 mm to provide a depression of 110.8 mm in width ($W_{71}$). As a result, the temperature difference on the surfaces of the edges and preformat pattern transfer area of the resin sheet was always kept within 20° C., and no resin sheet edges were seen to hang down.

On the optical card substrate sheet obtained, thicknesses, preformat pattern transfer efficiency and birefringence of the three preformat pattern transferred areas in the width direction were also measured to make evaluation.

EXAMPLE 3

As the specular roll 14 in Example 1, a specular roll having a depression 71 in the shape as shown in FIG. 8B was prepared in the following way: To the periphery of a specular roll substrate of 300 mm in diameter and 400 mm broad, chromium plating was applied, followed by mirror polishing to produce a specular roll having on its surface a chromium layer of 0.4 mm thick. Next, using a precision lathe, a depression in the shape as shown in FIG. 8B was formed in the chromium layer. The depression was made to have a depth $d_{71}$ of 0.38 mm, a bottom 72 width of 110.8 and an angle $\theta_{81}$ of 45°.

Using the specular roll 14 thus obtained, an optical card substrate sheet was produced in the same manner as in Example 1. As a result, the temperature difference on the surfaces of the edges and preformat pattern transfer area of the resin sheet was kept within 20° C., and no resin sheet edges were seen to hang down.

On the optical card substrate sheet obtained, thicknesses, preformat pattern transfer efficiency and birefringence of the three preformat pattern transferred areas in the width direction were also measured to make evaluation.

REFERENCE EXAMPLE 1

An optical card substrate sheet was produced in the same manner as in Example 2 except that the depression formed therein was made to have a width of 110.4 mm. As a result, the temperature difference on the surfaces of the edges and preformat pattern transfer area of the resin sheet was kept within 20° C., and no resin sheet edges were seen to hang down.

On the optical card substrate sheet obtained, thicknesses, preformat pattern transfer efficiency and birefringence of the three preformat pattern transferred areas in the width direction were also measured to make evaluation.

Results of evaluation in Examples 2 and 3 and Reference Example 1 described above are shown in Table 2 below.

TABLE 2

|  | 23'-A | 23'-B | 23'-C |
| --- | --- | --- | --- |
| Example 2: |  |  |  |
| Thickness: | A | AA | A |
| Transfer efficiency: | A | AA | A |
| Birefringence: | A | A | A |
| Example 3: |  |  |  |
| Thickness: | A | AA | A |
| Transfer efficiency: | A | AA | A |
| Birefringence: | A | AA | A |
| Reference Example 1: |  |  |  |
| Thickness: | A | A | A |
| Transfer efficiency: | B | A | B |
| Birefringence: | B | A | B |

EXAMPLE 4

A roll stamper was prepared in the following

To the desired region of the periphery of a roll substrate of 300 mm in diameter end 400 mm broad, made of carbon steel, a flexible stamper member of 110 mm broad end 0.2 mm thick, mede of nickel, was fixed by a mechanical means via a polyimide sheet of 0.1 mm thick to produce e roll stamper 24 having the crosssectional shape as shown in FIG. 5 and $h_{21}$ of 0.3 mm. On the surface of the flexible stamper member, three preformat patterns each comprised of a pattern formed in a rectangular region of 30 mm broad and 80 mm long, corresponding to optical card tracking grooves having a length of 85 mm, a width of 3 μm and a pitch of 12 μm were formed in the width direction of the flexible stamper member at intervals of 5 mm each other. The flexible stamper member was fixed to the roll substrate in the manner that their central lines X coincide each other as shown in FIG. 5.

In the meantime, as specular rolls 14 and 16, specular rolls of 300 mm in diameter end 400 mm broad, made of carbon steel, were prepared. As roll members 110, specular rolls of 30 mm in diameter and 80 mm broad, made of carbon steel, were prepared. In this instance, the roll members 110 each internally have a heating medium flow path so that the surface temperature can be controlled.

Using these members, an apparatus for manufacturing a substrate sheet for optical cards, as shown in FIG. 11 was set up. Here, the roll stamper 24 and the specular roll 14 were so provided as to give a gap $t_{61}$ of 0.4 mm between their surfaces. The roll members 110 were so provided that the resin sheet edges came in contact with the periphery of the roll stamper 24 at regions outward by 0.8 mm or more from the ends of the flexible stamper member 21 in the width direction. At the part where the resin sheet was separated from the roll stamper 24, radiation thermometers 121 were disposed as shown in FIG. 12, as e means 121 for measuring the surface temperature of the edges end preformet pattern transfer area of the resin sheet. Data therefrom were so made as to be fed back to a mans for controlling the surface temperature of the roll members 110.

Next, using this apparatus, an optical card substrate sheet of 0.4 mm thick was prepared. More specifically, using an extruder of 35 mm in diameter, a molten-resin sheet of 255 mm in width $W_{33}$ was formed under conditions of a die 12 temperature of 340° C. and a roll stamper 24 surface temperature of 145° C., at a throughput of 11 kg/h and an extrusion speed of 1.5 m/min. The resulting resin sheet was pressed between the roll stamper 24 and specular roll 14 and then between the roll stamper 24 and specular roll 16 to carry out transfer of preformat patterns for 5 hours. As a result, the temperature difference on the surfaces of the edges and preformat pattern transfer area of the resin sheet at the part where the resin sheet was separated from the roll stamper 24 was always kept within 10° C., and no resin sheet edges were seen to hang down.

On the optical card substrate sheet obtained, thicknesses, preformat pattern transfer efficiency and birefringence of the three preformat pattern transferred areas 23'-A, 23'-B and 23'-C (see FIG. 12) in the width direction were measured to make evaluation.

Results obtained are shown in Table 3 below.

TABLE 3

|  | 23'-A | 23'-B | 23'-C |
| --- | --- | --- | --- |
| Thickness: | AA | AA | A |
| Transfer efficiency: | A | AA | A |
| Birefringence: | A | AA | A |

EXAMPLE 5

The apparatus as shown in FIG. 14 was set up using air knives as the fluid pressure means in place of the roll members 110 used in Example 4.

The air knives were so provided that the air blew against the resin sheet edges so as for them to come in contact with the periphery of the roll stamper 24 at its regions outward by 0.6 mm or more from the ends of the flexible stemper member 21 in the width direction, and also the air knives were each provided at an angle $\theta_{131}$ of 45° so that the air did not flow toward the preformat pattern transfer area of the resin sheet. Data from a radiation thermometer were also so made as to be fed back to a means for controlling the temperature of the air, as in Example 4.

Next, using this apparatus, an optical card substrate sheet of 0.4 mm thick was prepared. More specifically, using an extruder of 35 mm in diameter, a molten-resin sheet of 255 mm in width $W_{33}$ was formed under conditions of a die 12 temperature of 340° and a roll stamper 24 surface temperature of 145° C., at a throughput of 11 kg/h and an extrusion speed of 1.5 m/min. The resulting resin sheet was pressed between the roll stemper 24 and specular roll 14 and then between the roll stamper 24 and specular roll 16 to carry out transfer of preformat patterns for 5 hours. The pressure of the air from the air knives was set at 15.9 g/cm². As a result, the temperature difference on the surfaces of the edges and preformat pattern transfer area of the resin sheet at the part where the resin sheet was separated from the roll stamper 24 was always kept within 10° C., and no resin sheet edges were seen to hang down.

On the optical card substrate sheet obtained, thicknesses, preformat pattern transfer efficiency and birefringence of the three preformat pattern transferred areas 23'-A, 23'-B and 23'-C (see FIG. 12) in the width direction were measured to make evaluation.

Results obtained are shown in Table 4 below.

TABLE 4

|  | 23'-A | 23'-B | 23'-C |
| --- | --- | --- | --- |
| Thickness: | AA | AA | AA |
| Transfer efficiency: | AA | AA | AA |
| Birefringence: | AA | AA | AA |

What is claimed is:

1. An apparatus for manufacturing a substrate sheet for information recording mediums, comprising:
    a roll stamper comprising a flexible stamper having a pattern corresponding to a preformat for an information recording medium, fixed along a periphery of a roll substrate;
    a roll disposed opposingly to the roll stamper; and
    a means for extruding a molten resin to form a molten-resin sheet having a larger width than said flexible stamper, which is so provided that the molten resin sheet is passed through a nip point between the roll stamper and the roll to transfer the pattern to a surface of the resin sheet, wherein said roll substrate has a larger width than said flexible stamper to form a protrusion on the peripheral surface of the roll stamper by the flexible stamper; and
    said apparatus has a means for bringing resin sheet edges into contact with the roll substrate before said resin sheet is separated from said roll stamper.

2. The apparatus according to claim 1, wherein said resin sheet edges are brought into contact with the corresponding periphery of said roll substrate by virtue of a depression formed in the periphery of said specular roll at a position facing a protrusion formed along the periphery of said roll stamper by said flexible stamper member.

3. The apparatus according to claim 2, wherein, when the gap defined between the bottom of said depression and the surface of said flexible stamper member 21 is represented by $t_{61}$, the gap defined between a top surface line of the depression of said specular roll and the surface of the roll stamper on which no flexible stamper member is fitted is represented by $t_{62}$ and the thickness of said flexible stamper member is represented by $h_{21}$, the depth of the depression in said specular roll is so set as to satisfy the relationship of the following expression (1):

$$0 < t_{62} < h_{21} + t_{61} \qquad (1).$$

4. The apparatus according to claim 3, wherein said depth of the depression in said specular roll is so set as to satisfy the relationship of the following expression (2):

$$0.9 t_{61} \leq t_{62} \leq 1.3 t_{61} \qquad (2).$$

5. The apparatus according to claim 4, wherein said depth of the depression of said specular roll is so set as to satisfy the relationship of the following expression (3):

$$|t_{61} - t_{62}| \leq 0.025 \times t_{61} \qquad (3).$$

6. The apparatus according to claim 2, wherein, when the width of said flexible stamper member is represented by $W_{21}$, the width of the depression in said specular roll is set to be not less than $(W_{21} + 2 \times t_{61})$ and not more than 0.95 time the width of said resin sheet.

7. The apparatus according to claim 6, wherein the width of the depression in said specular roll is set to be not less than $(W_{21} + 3 \times t_{61})$ and not more than 0.85 time the width of said resin sheet.

8. The apparatus according to claim 2, wherein said depression is formed by putting the corresponding periphery of said specular roll.

9. The apparatus according to claim 2, wherein said depression is formed by fixing a sheet member on each end of the periphery of said specular roll.

10. The apparatus according to claim 9, wherein said sheet member comprises a metal sheet.

11. The apparatus according to claim 9, wherein said sheet member comprises a heat-resistant resin sheet.

12. The apparatus according to claim 1, wherein said means for bringing said resin sheet edges into contact with the corresponding periphery of said roll stamper comprises a roll member provided opposingly to the region where no flexible stamper member is fitted at each end portion of said roll stamper.

13. The apparatus according to claim 12, wherein said roll member is so provided that said resin sheet edges come in contact with the periphery of said roll stamper at regions outward by a distance corresponding to the thickness of the preformat pattern transfer area of said resin sheet or more from the ends of said flexible stamper member.

14. The apparatus according to claim 12, wherein said roll member is so constituted that the surface temperature thereof can be controlled.

15. The apparatus according to claim 14, wherein a means for measuring surface temperature of the edges and preformat pattern transfer area of said resin sheet is provided at the part where said resin sheet is separated from said roll stamper, and a means by which the data obtained by said means is fed back to the surface temperature control means of said roll member is provided.

16. The apparatus according to claim 1, wherein said means for bringing said resin sheet edges into contact with the corresponding periphery of said roll substrate comprises a fluid pressure means provided opposingly to the region where no flexible stamper member is fitted at each end portion of said roll stamper.

17. The apparatus according to claim 16, wherein said fluid pressure member is so provided that said resin sheet edges come in contact with the periphery of said roll stemper at regions outward by a distance corresponding to the thickness of the preformat pattern transfer area of said resin sheet or more from the ends of said flexible stemper member.

18. The apparatus according to claim 16, wherein said fluid pressure member is so constituted that the temperature of the fluid from said fluid pressure member can be controlled.

19. The apparatus according to claim 18, wherein a means for measuring surface temperature of the edges and preformat pattern transfer area of said resin sheet is provided at the part where said resin sheet is separated from said roll stemper, and a means by which the data obtained by said means is fed back to the means for controlling the temperature of the fluid from said fluid pressure member is provided.

20. The apparatus according to claim 1, further comprises a means for attracting said resin sheet edges to the corresponding periphery of said roll stamper.

21. The apparatus according to claim 20, wherein said means for attracting said resin sheet edges to the corresponding periphery of said roll stamper comprises a charger for charging the resin sheet edges to a given polarity, provided opposingly to the region where no flexible stamper member is fitted at each end portion of said roll stamper, and a means by which the periphery of the roll stamper is charged to a polarity reverse to that of said resin sheet edges.

22. An apparatus for manufacturing a substrate sheet for information recording mediums, comprising:
 a roll stamper comprising a flexible stamper having a pattern corresponding to a preformat for an information recording medium, fixed along a periphery of a roll substrate;
 a roll disposed opposingly to said roll stamper; and
 a means for extruding a molten resin to form a molten-resin sheet having a larger width than said flexible stamper which is so provided that the molten resin sheet is passed through a nip point between the roll stamper and the roll to transfer the pattern to a surface of the resin sheet, wherein said roll substrate has a larger width than said flexible stamper to form a protrusion on the peripheral surface of the roll stamper by the flexible stamper; and;
 said roll has a depression formed in the periphery of the roll at a position facing the protrusion of the roll stamper to bring resin sheet edges into contact with the roll substrate before said resin sheet is separated from said roll stamper.

23. An apparatus for manufacturing a substrate sheet for information recording mediums, comprising:
 a roll stamper comprising a flexible stamper member having a pattern corresponding to a preformat for an information recording medium, fixed along a periphery of a roll substrate;
 a roll disposed opposingly to said roll stamper; and
 a means for extruding a molten resin to form a molten-resin sheet having a larger width than said flexible stamper, which is so provided that the molten resin sheet is passed through a nip point between the roll stamper and the roll to transfer the pattern to a surface of the resin sheet, wherein said roll substrate has a larger width than the flexible stamper to form a protrusion on the peripheral surface of the roll stamper by the flexible stamper; and;
 a roll member is provided opposingly to said roll stamper to bring edges of the resin sheet into contact with the roll substrate before said resin sheet is separated from said roll stamper.

24. An apparatus for manufacturing a substrate sheet for information recording mediums, comprising:

a roll stamper comprising a flexible stamper member having a pattern corresponding to a performat for an information recording medium, fixed along a periphery of a roll substrate;

a roll disposed opposingly to said roll stamper; and a means for extruding a molten resin to form a molten-resin sheet having a larger width than said flexible stamper member, which is so provided that the molten resin sheet is passed through a nip point between the roll stamper and the roll to transfer the pattern to a surface of the resin sheet, wherein said roll substrate has a larger width than the flexible stamper to form a protrusion on the peripheral surface of said roll stamper by the flexible stamper; and;

a fluid pressure means is provided opposingly to said roll stamper to bring edges of the resin sheet into contact with the roll substrate before said resin sheet is separated from said roll stamper.

25. An apparatus for manufacturing a substrate sheet for information recording mediums, comprising:

a roll stamper comprising a flexible stamper member having a pattern corresponding to a performat for an information recording medium, fixed along a periphery of a roll substrate;

a roll disposed opposingly to said roll stamper; and a means for extruding a molten resin to form a molten-resin sheet having a larger width than said flexible stamper which is so provided that the molten resin sheet is passed through a nip point between said roll stamper and the roll to transfer the pattern to a surface of the resin sheet, wherein said roll substrate has a larger width than the flexible stamper to form a protrusion on the peripheral surface of said roll stamper by the flexible stamper; and;

said apparatus has a means for charging edges of said resin sheet and the periphery of the roll substrate to being the edges into contact with the roll substrate before said resin sheet is separated from said roll stamper.

26. A process for manufacturing a substrate sheet for information recording mediums, comprising the steps of:

providing a roll stamper comprising a flexible stamper having a pattern corresponding to a preformat for an information recording medium on its surface, fixed along a periphery of a roll substrate and having a larger width than the flexible stamper and a roll disposed opposingly to said roll stamper; and melt-extruding a resin to form a molten-resin sheet having a larger width than the flexible stamper; and pressing said resin sheet between said roll stamper and the roll to transfer the pattern to the surface of the resin sheet; and bringing edges of the resin sheet into contact with the roll substrate before said resin sheet is separated from the roll stamper.

27. The apparatus according to claim 23, wherein a surface temperature control means of said roll member is provided so that a temperature difference on the surfaces of resin sheet edges and performat pattern transfer area of said resin sheet is kept within 30° C. when the resin sheet is separated from said roll stamper.

28. The apparatus according to claim 24, wherein said fluid pressure member is so constituted that the temperature of the fluid from said fluid pressure member can be controlled so that a temperature difference on the surfaces of the resin sheet edges and preformat pattern transfer area of said resin sheet is kept within 30° C. when the resin sheet has been separated from said roll stamper.

29. The process according to claim 26, wherein said resin sheet edges are brought into contact with the corresponding periphery of said roll substrate by virtue of a depression formed in the periphery of said roll at a position facing a protrusion formed along the periphery of said roll stamper by said flexible stamper.

30. The process according to claim 26, wherein said resin sheet edges are brought into contact with the corresponding periphery of said roll substrate by a roll member provided opposingly to the region where no flexible stamper is fitted at each end portion of said roll stamper.

31. The process according to claim 30, wherein the surface temperature of the roll member is controlled so that a temperature difference on the surfaces of resin sheet edges and preformat pattern transfer area of said resin sheet is kept within 30° C. when the resin sheet is separated from said roll stamper.

32. The process according to claim 31, which comprises detecting temperatures of the surfaces of the resin sheet edges and the preformat pattern transfer area of said resin sheet immediately after release from said roll stamper, and controlling the surface temperature of the roll member so as to make a difference between those temperatures small.

33. The process according to claim 26, wherein said resin sheet edges are brought into contact with the corresponding periphery of said roll substrate by fluid pressure.

34. The process according to claim 33, wherein the fluid pressure is in the range of from 5 to 50 g/cm$^2$.

35. The process according to claim 34, wherein the fluid pressure is in the range of from 10 to 20 g/cm$^2$.

36. The process according to claim 33, wherein the fluid temperature is controlled so that a temperature difference on the surface of resin sheet edges and preformat pattern transfer area of said resin sheet is kept within 30° C. when the resin sheet has been separated from said roll stamper.

37. The process according to claim 36, which comprises detecting temperatures of the surfaces of the resin sheet edges and the preformat pattern transfer area of said resin sheet immediately after being released from said roll stamper, and controlling the fluid temperature so as to make a difference between those temperatures small.

* * * * *

UNITED STATES PATENT AND TRADEMARK OFFICE
CERTIFICATE OF CORRECTION

PATENT NO. : 5,320,787
DATED : June 14, 1994
INVENTOR(S) : HISANORI HAYASHI, ET AL.

Page 1 of 3

It is certified that error appears in the above-identified patent and that said Letters Patent is hereby corrected as shown below:

COLUMN 1

Line 30, "end" should read --and--.
Line 33, "e" should read --a--.
Line 38, "Grooves" should read --grooves--.
Line 40, "00researc" should read --research--.

COLUMN 2

Line 2, "e" should read --a--.
Line 5, "Subsequently" should read --Subsequently,--.

COLUMN 5

Line 19, "is" (second occurrence) should be deleted.

COLUMN 7

Line 61, "Poll" should read --roll--.

COLUMN 8

Line 12, "Poll" should read --roll--.
Line 48, "rolls, ember" should read --roll member--.
Line 59, "end" should read --and--.

COLUMN 9

Line 18, "Gas" should read --gas--.
Line 30, "Gas" should read --gas--.
Line 47, "in" should read --in such--.

UNITED STATES PATENT AND TRADEMARK OFFICE
CERTIFICATE OF CORRECTION

PATENT NO. : 5,320,787
DATED : June 14, 1994
INVENTOR(S) : HISANORI HAYASHI, ET AL.

It is certified that error appears in the above-identified patent and that said Letters Patent is hereby corrected as shown below:

COLUMN 10

Line 28, "Thus e" should read --Thus, a--.
Line 31, "e" should read --a--.

COLUMN 11

Line 10, "end" should read --and--.
Line 21, "end" should read --and--.

COLUMN 12

Line 46, "thickness" should read --thickness:--.
Line 58, "criterions:" should read --criteria:--.
Line 60, "A: $\pm 5\mu m < T \leqq \pm +10\mu m$" should read --A: $\pm 5\mu m < T \leqq \pm 10\mu m$--.
Line 63, "birefringence" should read --birefringence:--.

COLUMN 13

Line 6, "criterions:" should read --criteria:--.
Line 10, "efficiency" should read --efficiency:--.
Line 11, "st" should read --at--.
Line 12, "preformet" should read --preformat--.
Line 17, "Groove" should read --groove--.
Line 20, "st" should read --at--.
Line 34, "hanged" should read --hung--.
Line 35, "preformet" should read --preformat--.

COLUMN 14

Line 43, "following" should read --following way.--.
Line 47, "mede" should read --made--.
Line 49, "e" should read --a-.

UNITED STATES PATENT AND TRADEMARK OFFICE
CERTIFICATE OF CORRECTION

PATENT NO. : 5,320,787
DATED : June 14, 1994
INVENTOR(S) : HISANORI HAYASHI, ET AL.

It is certified that error appears in the above-identified patent and that said Letters Patent is hereby corrected as shown below:

COLUMN 15

Line 14, "mans" should read --means--.
Line 65, "340°" should read --340°C.--.

COLUMN 18

Line 40, "and;" should read --and--.
Line 62, "and;" should read --and--.

COLUMN 19

Line 2, "performat" should read --preformat--.
Line 15, "and;" should read --and--.
Line 24, "performat" should read --preformat--.
Line 37, "and;" should read --and--.
Line 40, "being" should read --bring--.

Signed and Sealed this

Twenty-seventh Day of December, 1994

Attest:

BRUCE LEHMAN

Attesting Officer     Commissioner of Patents and Trademarks